M. S. REIGH.
ATTACHMENT FOR HORSESHOES.
APPLICATION FILED AUG. 30, 1911.
1,033,469.
Patented July 23, 1912.
2 SHEETS—SHEET 1.
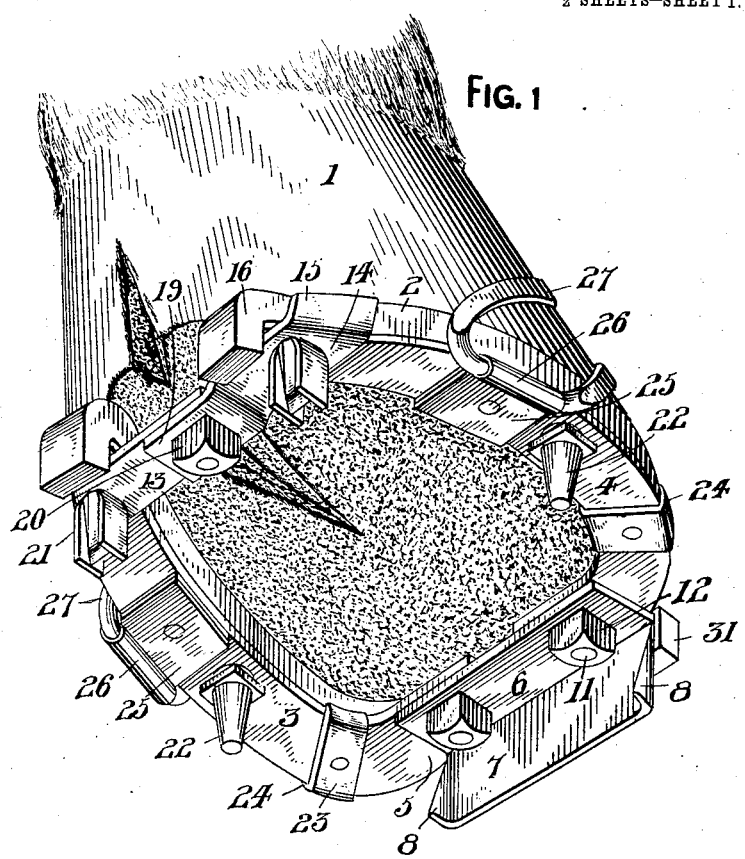
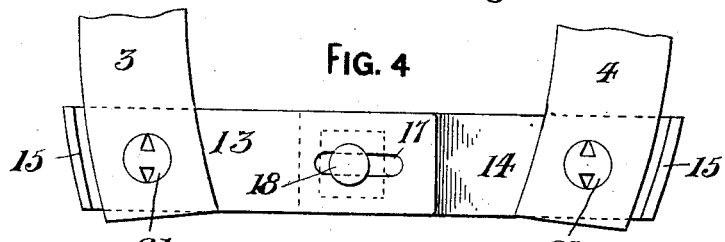
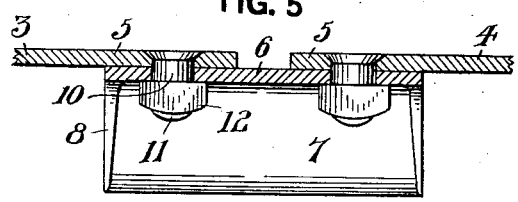
WITNESSES:
INVENTOR.
Martin S. Reigh
BY
ATTORNEYS.

M. S. REIGH.
ATTACHMENT FOR HORSESHOES.
APPLICATION FILED AUG. 30, 1911.
1,033,469.
Patented July 23, 1912.
2 SHEETS—SHEET 2.
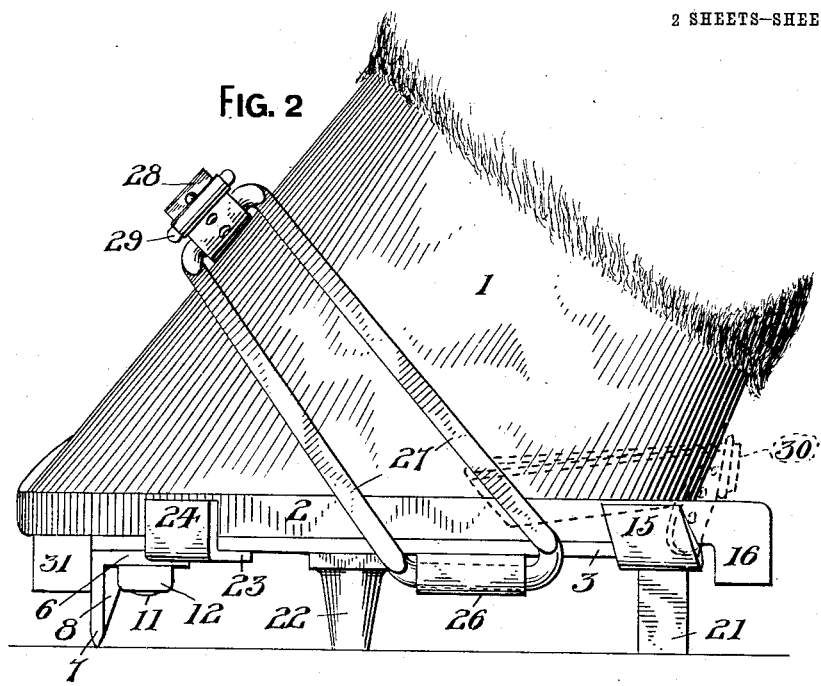
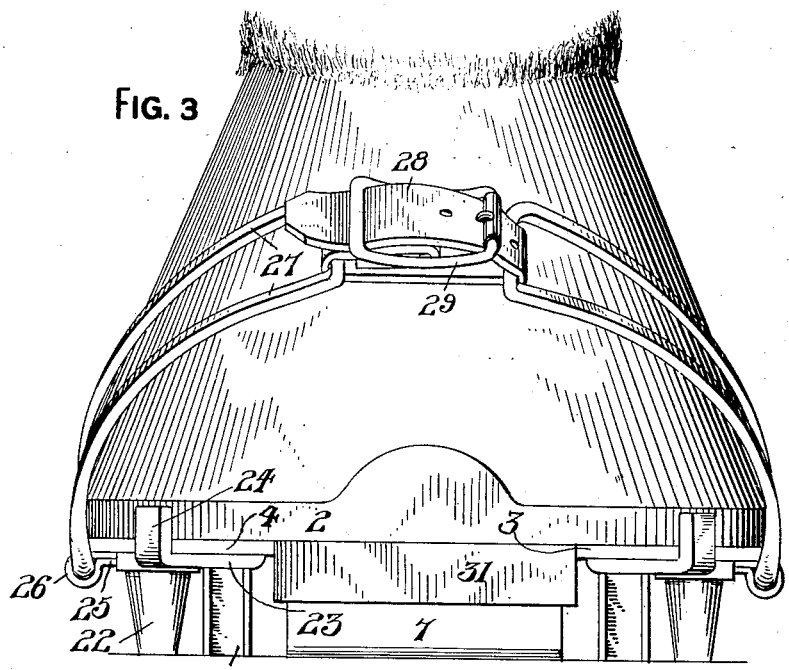

UNITED STATES PATENT OFFICE.

MARTIN S. REIGH, OF PITTSBURGH, PENNSYLVANIA.

ATTACHMENT FOR HORSESHOES.

1,033,469.  Specification of Letters Patent.  Patented July 23, 1912.

Application filed August 30, 1911. Serial No. 646,834.

*To all whom it may concern:*

Be it known that I, MARTIN S. REIGH, a citizen of the United States of America, residing at Pittsburgh, in the county of Allegheny and State of Pennsylvania, have invented certain new and useful Improvements in Attachments for Horseshoes, of which the following is a specification, reference being had therein to the accompanying drawing.

This invention relates to attachments for horse shoes, and has for its object to provide in a manner as hereinafter set forth, an attachment which can be conveniently coupled with the hoof of a horse or other animal to prevent the animal from slipping or sliding upon frozen and smooth surfaces.

A further object of the invention is to provide in a manner as hereinafter set forth, an attachment for the purpose referred to, which is capable of being adjusted to fit hoofs of various sizes.

Further objects of the invention are to provide an attachment for horse shoes which is comparatively simple in its construction and arrangement, strong, durable, efficient in its use, conveniently coupled to the hoof of the animal and comparatively inexpensive to manufacture.

With the foregoing and other objects in view, the invention consists of the novel construction, combination, and arrangement of parts as hereinafter more specifically described and illustrated in the accompanying drawings, wherein is shown the preferred embodiment of the invention, but it is to be understood that changes, variations, and modifications can be resorted to which come within the scope of the claim hereunto appended.

In describing the invention in detail, reference is had to the accompanying drawing, wherein—

Figure 1 is a perspective view of the attachment in accordance with this invention, coupled with the hoof of an animal; Fig. 2 is a side elevation illustrating an attachment in operative position with respect to the hoof of an animal; Fig. 3 is a front elevation of a horse's hoof, showing the attachment secured in position with respect thereto; Fig. 4 is a plan of the heel portion of the attachment; Fig. 5 is a longitudinal sectional view of the toe portion of the attachment.

Referring to the drawings in detail, 1 denotes the hoof of the animal, 2 the shoe secured thereto, and coupled against the shoe is a non-slipping or sliding attachment in accordance with this invention.

The attachment includes a pair of side bars 3, 4, each having the forward end thereof provided with a right angularly disposed portion 5. The bars 3, 4 are adapted to be positioned against the sides of the shoe 2 while the angular ends 5 are arranged against the toe of the shoe. The right angular ends 5 have arranged against their outer face, a transversely extending plate 6 formed with a depending toe calk 7 formed with angular ends 8. The plate 6 is detachably connected to the angular ends 5, by the threaded bolts 10, which have their heads countersunk in the inner face of the angular ends 5 and have their shanks extending through said ends 5, and also through the plate 6. Mounted upon the lower threaded ends 11 of the bolts 10 are nuts 12, which, are screwed against the plate 6, fixedly to secure the ends 5 to the said plate. When the nuts 12 are loosened, the ends 5 can be swung upon the plate 6, whereby the bars 3, 4, can be shifted to increase or decrease the width of the attachment to provide for shoes of various sizes.

The bars 3, 4 are adjustably connected at their heel ends through the medium of a pair of transversely extending plates 13, 14, each of which has its outer end bent upwardly, as at 15 to engage the side of the shoe 2. The plates 13, 14 are arranged in proximity to the heel 16 of the shoe.

The plate 13 is formed at its inner end with a longitudinally extending slot 17, through which extends a bolt 18, the latter having its threaded end projecting through and depending from the inner end of the plate 14. The inner portion of the plate 14 is offset, as at 19, and receives the inner end of the plate 13. Mounted upon the threaded end of the bolt 18 is a nut 20 for securing the plates 13, 14 together in an adjusted position. By the foregoing construction it is obvious that the plates 13, 14 can be shifted toward, or away, from each other when the bars 3, 4 are adjusted to provide for shoes of various sizes.

The plate 13, as well as the bar 14, in proximity to its outer end is provided with a depending auxiliary heel calk 21. The bar 3, as well as the bar 4, forwardly of the calks 21, is provided with a calk 22 which is detachably secured to its respective bar.

Forwardly of the calk 22, the bar 3, as well as the bar 4 has secured thereto, a retaining member 23, which consists of a strip of metal bent to provide at one end, a vertically disposed flange 24, which is adapted to overlap the shoe 2.

Fixed to the bar 3, as well as the bar 4, between calks 21 and 22, is a strip of metal 25 bent upon itself and offset to provide a loop 26 in which is loosely mounted a curved link 27. The links 27 are adapted to extend around the forward portion of the hoof 1, and are connected together by a strap 28 and a buckle 29.

To prevent creeping forward of the links 27, if the shoe 2 is not provided with a toe-piece 31, which constitutes an abutment for the toe calk 7, a strap 30 is provided, which is connected with the links 27 and extends around the rear of the hoof.

What I claim is:

An attachment for horseshoes comprising a pair of adjustable bars capable of conforming to the shape of a shoe and positioned against the outer face of the shoe, each of said bars having an inwardly extending right angularly disposed portion at its forward end, said angular portions opposing each other, a plate mounted against the lower faces of said angular portions and provided at its forward position with a depending toe calk, means extending through each end of said plate and an angular portion for adjustably connecting said plate and angular portion together, a pair of transversely extending members arranged at the rear of said bars overlapping each other at their inner ends and each having its outer end provided with an upward flange positioned against the side of a shoe forwardly of the heel, means for connecting the outer ends of said members to said bars, means for adjustably connecting the overlapping ends of said members together, flanged means carried by said bars at the forward portions thereof and capable of overlapping the shoe, means secured to the lower face of each of said bars approximately centrally thereof and providing a pair of loops, a curved link projecting from each of said loops and adapted to extend around the horse's hoof, means for connecting said links together, and a strap adapted to be arranged around the rear of the hoof and connected to said links.

In testimony whereof I affix my signature in the presence of two witnesses.

MARTIN S. REIGH.

Witnesses:
 Max H. Srolovitz,
 Christina F. Hood.

---

Copies of this patent may be obtained for five cents each, by addressing the "Commissioner of Patents, Washington, D. C."